(12) United States Patent
Hildebran

(10) Patent No.: US 7,941,229 B2
(45) Date of Patent: May 10, 2011

(54) HIGH-SPEED SEQUENTIAL SAMPLING OF I/O DATA FOR INDUSTRIAL CONTROL

(75) Inventor: Bret S. Hildebran, Chagrin, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 379 days.

(21) Appl. No.: 11/758,908

(22) Filed: Jun. 6, 2007

(65) Prior Publication Data

US 2008/0307125 A1    Dec. 11, 2008

(51) Int. Cl.
*G05B 19/18* (2006.01)
*G06F 5/00* (2006.01)

(52) U.S. Cl. .............................. 700/2; 710/58

(58) Field of Classification Search .............. 700/1–4, 700/11; 710/52, 53, 58, 35; 375/220; 702/182, 702/187, 188; 711/5; 709/230
See application file for complete search history.

(56) References Cited

U.S. PATENT DOCUMENTS

| | | | |
|---|---|---|---|
| 4,571,671 A * | 2/1986 | Burns et al. ................. 710/35 |
| 4,849,893 A * | 7/1989 | Page et al. .................... 701/3 |
| 5,064,314 A | 11/1991 | Grooms et al. | |
| 5,099,449 A | 3/1992 | Dombrosky et al. | |
| 5,212,483 A * | 5/1993 | Wakimoto ................ 341/141 |
| 5,463,735 A * | 10/1995 | Pascucci et al. ............ 709/222 |
| 5,884,072 A * | 3/1999 | Rasmussen ................ 709/223 |
| 5,933,347 A * | 8/1999 | Cook et al. ................. 700/82 |
| 6,662,247 B1 | 12/2003 | Ales et al. | |
| 6,671,343 B1 * | 12/2003 | Ito .............................. 375/376 |
| 6,721,900 B1 | 4/2004 | Lenner et al. | |
| 6,792,513 B2 * | 9/2004 | Bade et al. ................. 711/147 |
| 6,909,923 B2 | 6/2005 | Vasko et al. | |
| 6,941,424 B2 * | 9/2005 | Bade et al. ................. 711/147 |
| 6,968,292 B2 * | 11/2005 | Boyer ........................ 702/182 |
| 2002/0042844 A1 * | 4/2002 | Chiazzese ................. 709/248 |
| 2003/0120841 A1 * | 6/2003 | Chang et al. .............. 710/52 |
| 2003/0208283 A1 | 11/2003 | Vasko et al. | |
| 2004/0117495 A1 * | 6/2004 | Louzoun et al. ........... 709/230 |

FOREIGN PATENT DOCUMENTS

EP    1772788 A2    11/2007

OTHER PUBLICATIONS

Rockwell Automation Fair 2006, Baltimore, Maryland. Oct. 25-26, 2006 [retrieved Aug. 27, 2010]. Retrieved from the Internet <url:http://www.mrktgsolutions.com/Rockwell Automation Fair 2006 Report.pdf>, 20 pgs.*
Marrone, Fabrizio, Extended European Search Report (EP 08157481), Oct. 2, 2009, European Patent Office, Munich, Germany. Powerpoint presentation used at Rockwell Automation University in 2005.

* cited by examiner

Primary Examiner — Albert Decady
Assistant Examiner — Dave Robertson
(74) Attorney, Agent, or Firm — Boyle Fredrickson LLP; R. Scott Speroff; John M. Miller

(57) ABSTRACT

An I/O module samples an industrial process to acquire data indicative of performance of the industrial process. The I/O module has an internal memory in which the data from multiple samples is stored until readout by, or produced to, an industrial controller. The I/O module assigns a time-stamp identifier to the stored samples thereby providing time information to the industrial controller for the stored data when read out by the industrial controller.

10 Claims, 5 Drawing Sheets

HIGH-SPEED SEQUENTIAL SAMPLING OF I/O DATA FOR INDUSTRIAL CONTROL

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates to an industrial control system used for real-time control of industrial processes, and in particular to an I/O module that samples a signal from a component of an industrial process, stores multiple samples from the component as a data block, and then outputs the data block to an industrial controller synchronously.

Industrial controllers are special purpose computers used for controlling industrial processes and manufacturing equipment on a real-time basis. Under the direction of a stored program, the industrial controller examines a set of inputs reflecting the status of the controlled process and changes a set of outputs controlling the industrial process. The inputs and outputs may be binary, which is on or off, or analog, providing a value within a continuous range. Typically analog signals are converted to binary words for processing. Industrial controllers differ from conventional computers in that their hardware configurations vary significantly from application to application reflecting their wide range of uses. This variability is accommodated by constructing the industrial controller on a modular basis having removable input and output (I/O) modules that may accommodate different numbers of input and output points depending on the process being controlled. The need to connect the I/O modules to different pieces of machinery that may be spatially separated has led to the development of a remote I/O rack holding a number of I/O modules at a remote location to communicate with a central processor of the industrial control via an adapter module, which in turn is connected with a high speed network linked to the central processor. The adapter exchanges information between the network and the I/O modules.

Industrial controllers further differ from conventional computers in that they must process a large amount of input and output data on a predictable real-time basis. This requires not only that the response time of the industrial controller be extremely fast, but also that the processing delay between a changing input and the response of a reacting output be consistent so that the controller operates predictably over time.

To satisfy these requirements of speed and consistency, many industrial controllers use a "scan" based architecture in which each input and output are sequentially read and written over repeated scans of regular duration. Newer industrial controllers may use a producer/consumer model which allows I/O modules to produce data when sampled rather than waiting for a controller scan. This produce/consume protocol may also be used in the communication between an adapter module and the I/O modules of a remote I/O rack. The immediate production of data makes the data available to be used in the system as quickly as possible and reduces overhead on the controller to actively scan all inputs, even when no new data is available.

During operation of an industrial process, the industrial controller consumes data produced by the I/O modules, which acquires or samples data from various components of the industrial process, in a timed loop. Conventionally, each I/O module has included a buffer that stores a single sample of data from a component of the industrial process. When the I/O module is polled by the industrial controller or in a producer/consumer model when the I/O module determines it is time to send the data, the content of the buffer is output to the industrial controller; however, since the I/O module is continuously or periodically sampling the controlled component, samples are acquired that are never fed to, or processed by, the industrial controller. That is, conventional I/O modules sample the controlled components at a sampling rate that is faster than the scan rate of the industrial controller, whether the scan rate is the polling rate of the industrial controller or the industrial controller data processing rate, typically program scan time.

FIG. 1, for example, illustrates the data flow for a conventional I/O module. In this example, data is acquired at a sampling rate defined by sampling interval 1. No delay is assumed between the acquisition of data from the industrial process at the sampling interval 1 and the output of that data to the industrial controller. Thus, at $t_0$, a sample $S_0$ is acquired and the data $A_0$ for that sample is output to the industrial controller, which reads the data from the I/O module, for purposes of illustration, at $t_0$. At $t_1$, the I/O module again samples $S_1$ the industrial process to acquire data $A_1$. However, since the industrial controller polled the I/O module for one polling interval 2 at $t_0$, at $t_1$, the industrial controller has proceeded in its polling loop to poll the next I/O module in the loop. Thus, data $A_1$ is not output to the industrial controller at $t_0$. Similarly, the data $A_2$ for sample $S_2$ acquired at $t_2$ is not output to the industrial controller. Similarly in a producer/consumer model the I/O module may have produced the data to the controller, but the controller may not have had time to process the new data, given its own internal program scan, and thus missed processing the $A_1$ and $A_2$ data. In a producer/consumer system newly produced data will automatically overwrite older data. If the controller does not process $A_1$ in a timely manner the data will be overwritten and lost when $A_2$ is produced by the I/O module. Moreover, in conventional I/O modules, the data for only a single sample is stored in a buffer. Thus, data $A_1$ will be written over by data $A_2$ at $t_2$ at the next sampling interval 1. This cycle repeats until the next time the I/O module is polled by the industrial controller. For an I/O module that is polled at time intervals of length 20, the next data provided to the industrial controller will be the data $A_{19}$ acquired from the controlled component in sample $S_{19}$ at $t_{19}$. Accordingly, one of the drawbacks of conventional I/O modules is the loss of data between I/O module readout intervals if the controller processing rate is not synchronized precisely with the module sampling period.

To minimize the effect of this unused data, one proposed solution is to increase the polling rate of the industrial controller. By doing so, the I/O module may be polled at time intervals of 10, for example, thereby decreasing the amount of data that is discarded, but this requires a lot more processing power in the controller and focuses limited resources solely on processing I/O data. Another proposed solution is to decrease the sampling rate of the I/O modules. Because both solutions would effectively reduce the amount of data that is acquired but not used in assessing performance of the industrial process, both solutions are impractical for high speed applications.

In the case of the latter, reducing the sampling rate of the I/O module decreases the precision of the monitoring function performed by the I/O module. For example, a signal from a component may be sampled to acquire data over a given period of time to determine any trends in performance of the component. By reducing the number of samples acquired from the controlled component, it may be difficult to properly determine changes in the trend or the causes of any such changes. In the case of the former, an increase in the polling rate of the industrial controller may not be possible because the communication overhead associated with data transfer between the industrial controller and the I/O modules limits the speed at which data can be read.

BRIEF SUMMARY OF THE INVENTION

The present inventors have found that the amount of overhead associated with data communication between an I/O module and an industrial controller does not significantly increase as the size of the communication between an I/O module and the industrial controller increases. As such, the inventors have found that despite a significant increase in the size of the transmission between an I/O module and the industrial controller, the amount of time associated with that transmission does not significantly increase. Thus, this lack of significant increase in communication time can be utilized to transmit larger data packets than are customarily transmitted by I/O modules of an industrial control system.

Accordingly, in one aspect, the present disclosure is directed to an I/O module that periodically samples a component and stores the data from those multiple samples in an internal memory. The contents of that memory are then input to the industrial controller when the I/O module is polled by the industrial controller (I/O module readout) or in the case of a producer/consumer system, when the contents of that memory are full. With an appropriately sized memory, the size of the sample block can be sufficient to contain data for all the samples taken between I/O module readouts. One feature of the invention is that it allows high-speed process data to be sampled and communicated within the framework of a polled data communications system or a producer/consumer system between the industrial controller and the I/O modules.

In another aspect, the I/O module assigns a time-stamp identifier to the contents of the internal memory. In one embodiment, the time-stamp identifier corresponds to the time at which the data for the last sample was acquired by the I/O module. From the time-stamp identifier and the known I/O module Real Time Sample (RTS) period, the industrial controller can then extrapolate acquisition times for all the data samples. This time information can then be used by the industrial controller to synchronize the data from one I/O module with that of other I/O modules of the industrial control system to provide a time-dependent snapshot of the industrial process. A feature of this embodiment of the invention is that it allows the transmission of high-speed process data, without an increase in transmission overhead, by sharing a single timestamp among the samples. Because high-speed sample data is normally sampled on a fixed interval, absolute time values may be derived for each sample.

To provide a robust data synchronization between I/O modules, in one aspect of the present disclosure, each I/O module has an internal clock that is synchronized with a master clock of the industrial controller.

Another feature of at least one embodiment of the present invention is that the timestamp may allow the industrial controller to respond correctly to data from multiple I/O modules each collecting and transmitting groups of samples, while still determining the absolute ordering of each of the multiple samples on a global basis.

In another aspect, the present disclosure includes an I/O module providing on-board archiving of data acquired from an industrial process. In a further aspect, the I/O module acquires one or more channels of data and, as such, archives one or more channels worth of data for subsequent I/O processing by the industrial controller.

In another aspect, the I/O module can be programmed in the field, for example, to define the size of the internal memory to provide control and flexibility in the amount of data provided to the industrial controller during I/O module readout or production.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 2:
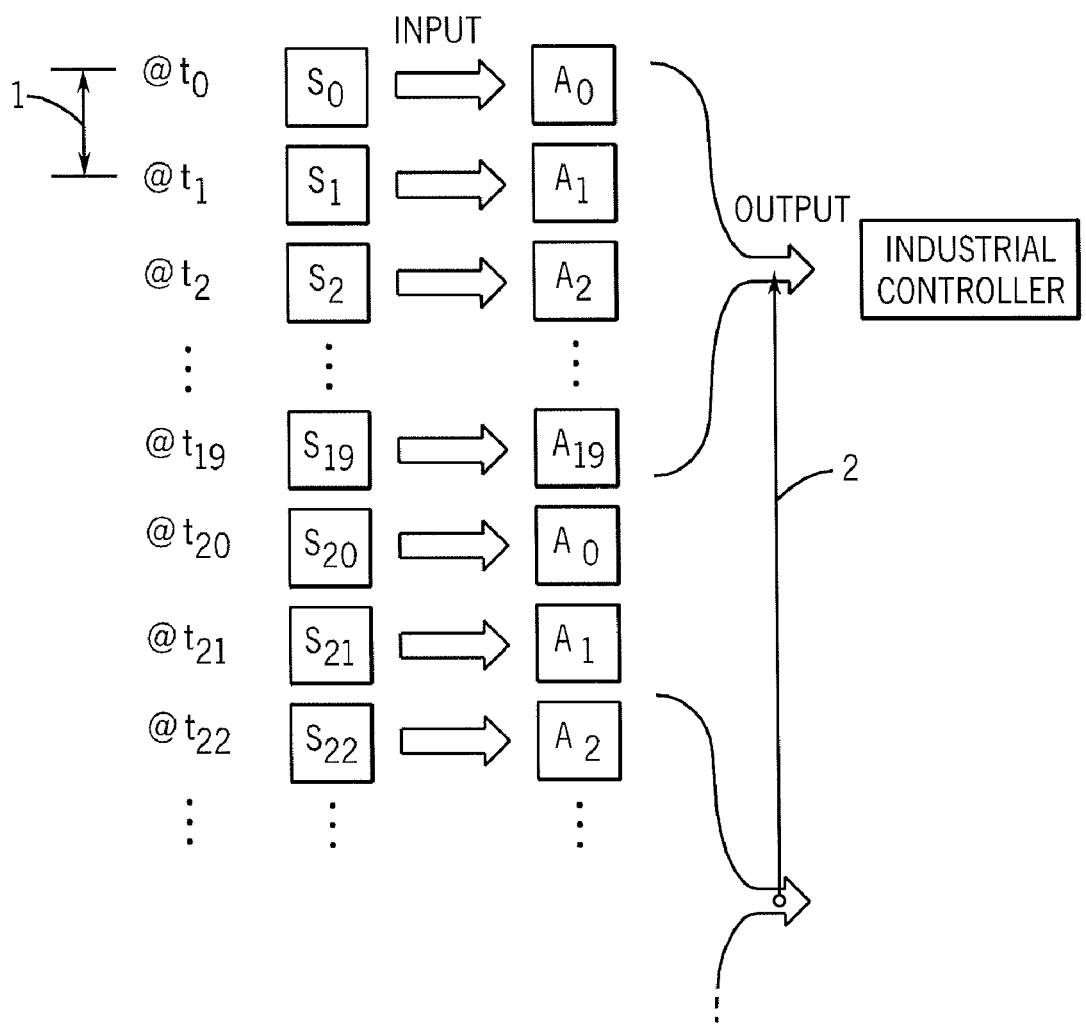
FIG. 2 is block diagram illustrating the sampling of an I/O module and the storing the data from the multiple samples in a single data block for I/O module readout by or production to an industrial controller in accordance with one aspect of the present disclosure.

The present invention is generally directed to an industrial control system and, more specifically, to an I/O module that acquires data from one or more components of an industrial process and provides that data to an industrial controller for the industrial process. The I/O module, in one aspect of the present disclosure, acquires and stores multiple samples of data that can be collectively readout by the industrial controller. For example, as illustrated in FIG. 2, samples may be acquired of a component of an industrial process periodically at a sampling rate 1. In the illustrated example, the samples $S_0$-$S_{19}$ are acquired during a time interval defined by $t_0$-$t_{19}$. The data associated with the samples $S_0$-$S_{19}$ is then stored in an internal memory of the I/O module, represented by data array $A_0$-$A_{19}$. In the illustrated example, the internal memory is sized to hold data for 20 samples. At $t_{19}$, the entire contents of the I/O internal memory are produced to the industrial controller. One skilled in the art will appreciate that there may be some delay between the acquisition of sample $S_{19}$ and the data production at $t_{19}$; however, for purposes of simplicity in the illustration, that delay is assumed to be zero.

As schematically shown in FIG. 2, at $t_{19}$, data $A_0$-$A_{19}$ is fed to the industrial controller when the I/O module produces the data. The industrial controller then processes the produced data at a polling rate 2 representative of its internal data processing scan. At $t_{20}$, sampling renews and the internal memory of the I/O module is populated as described above until the contents of the internal memory are provided to the industrial controller in the next polling of the I/O module by the industrial controller at $t_{39}$.

Figure 1:
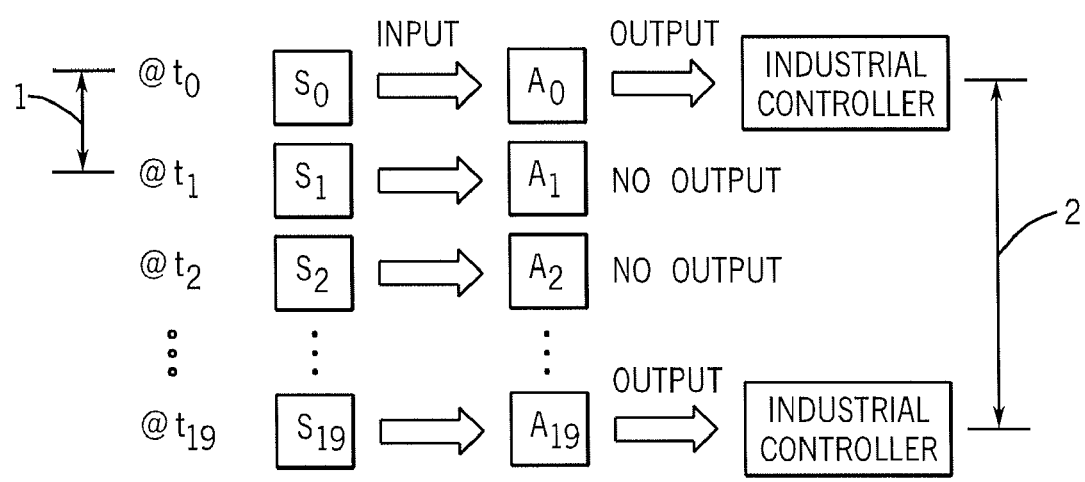
FIG. 1 is a block diagram illustrating the sampling of an I/O module and I/O module readout by an industrial controller in accordance with the prior art.

The I/O module may thus provide data for multiple samples without requiring an increase in the sampling rate of the industrial controller. Moreover, in contrast to conventional I/O modules, see FIG. 1, there is not a discarding of data that is acquired between I/O module readouts. For example, as described with respect to FIG. 1, in conventional I/O modules, data $A_1$-$A_{19}$ would have been discarded since the I/O module was not polled by the industrial controller during that time or in the case of a produce/consume model while the data $A_1$-$A_{19}$ would have been sent to the controller, the controller's internal data processing scan would not have had time to process them allowing them to be overwritten by $A_{20}$ and thus never be used for control. The present disclosure provides that data $A_1$-$A_{19}$ associated with samples $S_1$-$S_{19}$ acquired at times $t_1$-$t_{19}$ is stored in the internal memory of the I/O module. As discussed above, this bundle of data can then be fed to the industrial controller during readout of the I/O module to provide a comprehensive view of activity of the controlled component during the $t_0$-$t_{19}$ interval rather than just at times $t_0$ and $t_{19}$.

Figure 3:
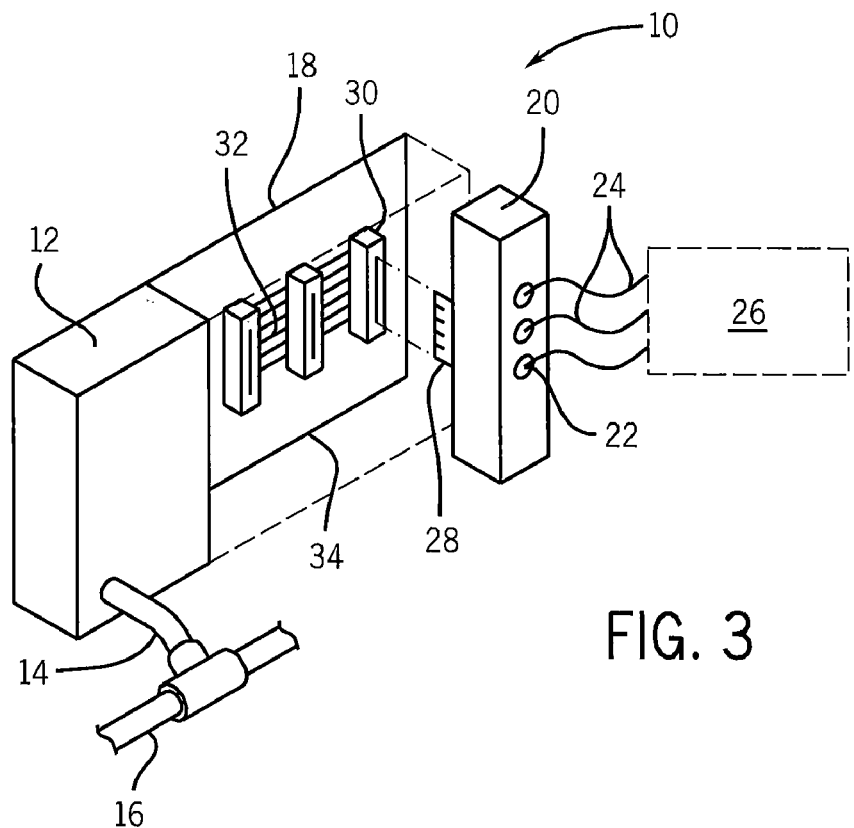
FIG. 3 is a simplified perspective view, in partial phantom, of an I/O system having an adapter communicating on a backplane to one or more detachable I/O modules which provide signals and receive signals with an industrial process.

Referring now to FIG. 3, an I/O system 10 incorporating an I/O module that provides the functionality described above and for use with an industrial controller includes an adapter module 12 providing a connection 14 to a high-speed, serial network 16. The network 16 may be any one of a number of high-speed serial networks including ControlNet, EtherNet or the like. The adapter module 12 communicates over the network 16 with an industrial controller (not shown) to receive output data from the industrial controller or to provide input data to the industrial controller to be processed according to a control program.

The adapter module 12 communicates with a backplane 18 to connect it to one or more I/O modules 20. The I/O modules 20 connect via I/O lines 24 with a controlled process 26. As is understood in the art, the I/O modules 20 convert digital data received over the backplane 18 from the adapter module 12 into output signals (either digital or analog) in a form suitable for connection to the industrial process 26.

The I/O modules 20 may also receive digital or analog signals from the industrial process 26 and convert it to digital data suitable for transmission on the backplane 18 to the adapter module 12.

Modularity of the I/O system 10 is provided through a rear extending connector 28 on each J/O module 20 which may be mated with any one of a number of connectors 30 extending from the front surface of the backplane 18. The connectors 30 are each associated with "slots" providing mechanical features (not shown) for otherwise securing the I/O module 20.

In the shown parallel bus embodiment, connectors 30 receive parallel data bus conductors 32, over which data may be read and written, and slot addresses/multicast groups are embedded in the data sent to indicate the slot(s) and hence the I/O module 20 for which the data of data bus conductors 32 is intended or from which data is being produced. The data bus conductors 32 also include control lines including a clock and read/write line indicating timing for a data transfer according to techniques well known in the art.

In an alternative serial bus embodiment, not shown, slot address signals are attached to the data blocks sent over a serial data bus connector or are implicit in the ordering or timing of the data blocks being sent. Further in an alternative polled system, slot signals 34 may be enabled one at a time to indicate the I/O module 20 for which the data bus conductors 32 is intended to read or write.

Figure 4:
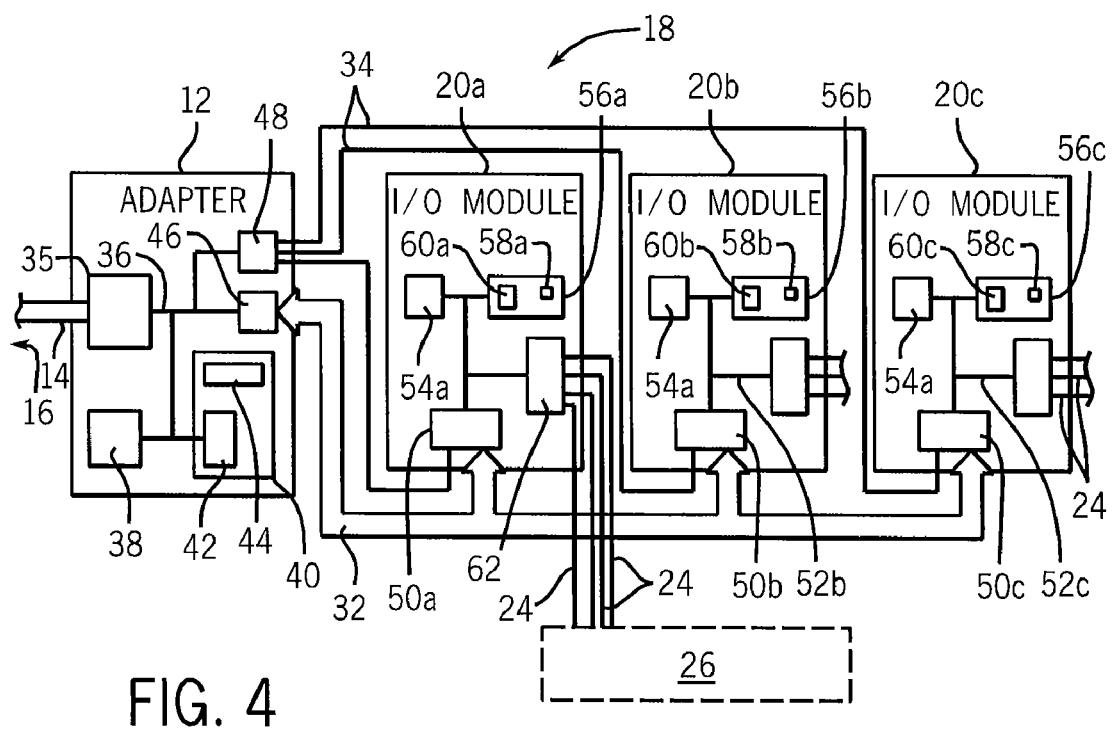
FIG. 4 is a block diagram of the I/O system of FIG. 1 showing the interconnection of the adapter to the I/O modules.

Referring now to FIG. 4, the adapter module 12 includes a network interface 35 communicating with the connector 14 to decode and encode data exchanged with the network 16. The network interface 35 in turn communicates with an internal bus 36 which connects the network interface 35 to a processor 38 and a memory 40. The memory 40 includes a buffer 42 (divided into input and output sections) and an operating program 44 allowing the processor 38 to operate on the data passing on the internal bus 36 according to the methods of the present invention as will be described.

The internal bus 36 also connects to backplane data interface 46 and backplane address decoder 48 I/O modules 20a-20c, when connected to the backplane 18, communicate with the data bus conductors 32 and slot address signals 34 via a backplane interface 50a-50c, respectively. In each I/O module 20a-20c, backplane interface 50 (each component denoted a-c to reflect the particular I/O module) in turn communicates with an internal bus 52, which communicates with an internal processor 54 and memory 56, the latter which includes a buffer portion 58 and an operating program 60 to allow the practice of the present invention. The internal bus 52 also communicates with I/O circuitry 62 providing level shifting, conversion and filtering necessary for the interface to the controlled process. The backplane interface 50 and address decoders 48 and 46 may be application-specific integrated circuits, which are not easily reprogrammable. A feature of the present invention is that it does not require a change in the basic backplane protocol established by these backplane circuits 50, 48 and 46 and that it allows overlaying of a new functionality on an existing system, this being one example, without significant change to the underlying architectural components.

As noted with reference to FIG. 2, I/O module 20 may store data from multiple samples of a component of an industrial process 26. Accordingly, buffer portion 58 is preferably sized to accommodate the amount of data acquired by the I/O module during intervals between readout by or production to the industrial controller. Additionally, since the I/O module 20 may sample multiple components of the industrial process 26 simultaneously across multiple channels, the buffer portion 58 may be segmented into multiple partitions 58a, 58b, 58c, 58d to accommodate data storage from the multiple components.

Figure 5:
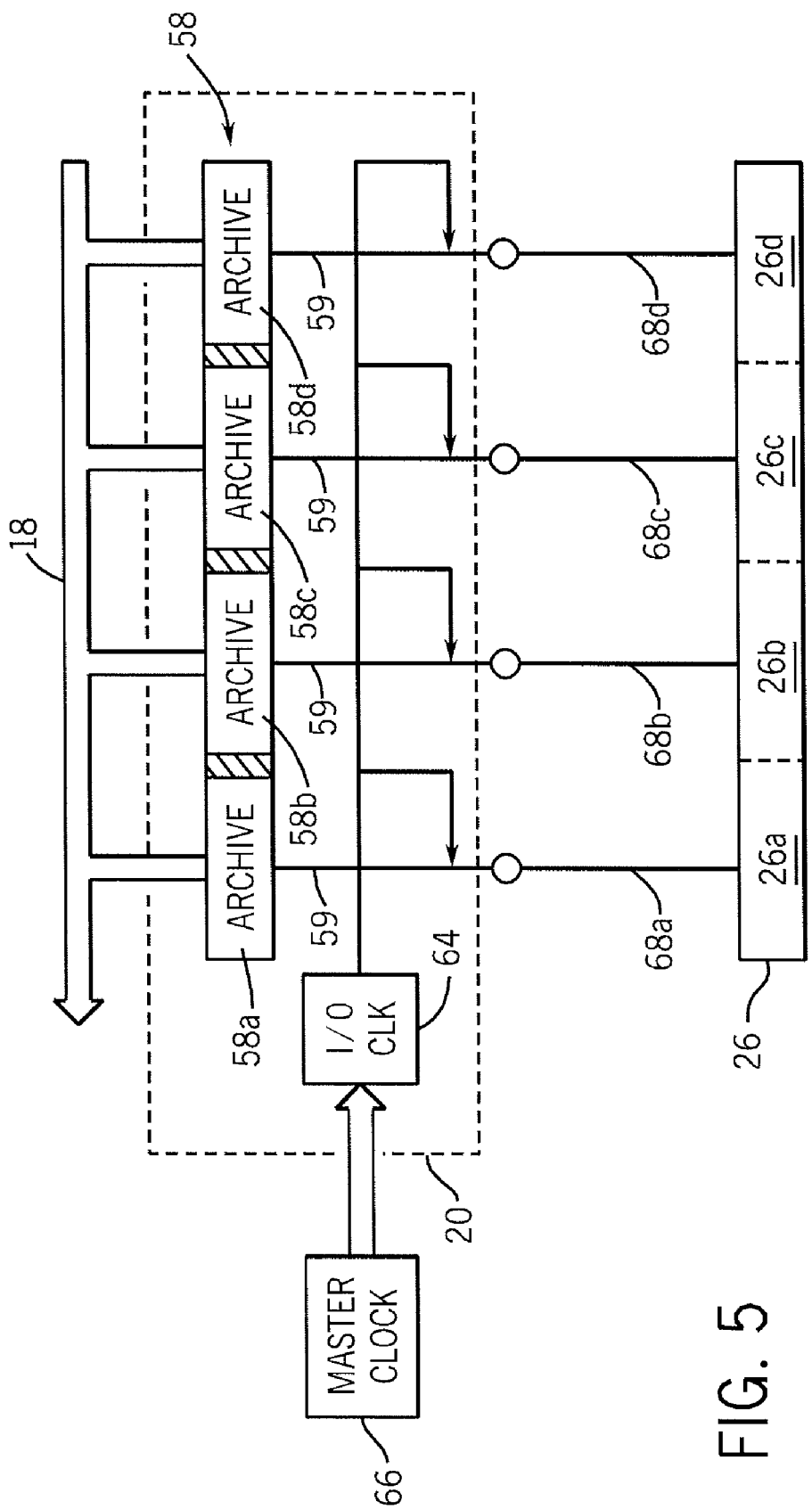
FIG. 5 is a block diagram of a multi-channel I/O module that samples an industrial process and stores sampled data as a data block to be output to an industrial controller when the I/O module is polled by the industrial controller or produced by the I/O module.

For example, and referring to FIG. 5, I/O module 20 is shown configured to acquire multiple channels of data from multiple components or portions 26a-26d of the industrial process 26. Sampling of the components 26a-26d is clocked by internal clock circuitry 64 so that samples may be acquired at a regular sample rate 1. The internal clock circuitry 64 is synchronized with a master clock 66 of the industrial control I/O system 10 so that data acquisition and communication for the I/O module 20 is in sync with other I/O modules of the system 10. It is understood that the I/O module 20 may have stored programs that control the internal clock circuitry 64 to maintain a synchronicity with the master clock 66 and the same absolute time value as the master clock 66, as is known in the art.

Data is acquired from the components 26a-26d via data lines 68a-68d. While hardwire data lines are shown, it is contemplated that the I/O module 20 may include circuitry for wireless sampling of the components 26a-26d. In addition to synchronizing I/O module 20 activity with other I/O modules of the I/O system 10, internal clock circuitry 64 also time-stamps data as it is acquired from components 26a-26d. The time-stamped data 59 is then stored in buffer portion 58. As noted previously, in a preferred embodiment, buffer portion 58 is segmented in partitions 58a-58d, each capable of holding a data block, one for each channel of the I/O module 20; although, it is recognized that separate buffer portions altogether could be used.

As noted above, internal clock circuitry 64 time-stamps the data as it is acquired from the industrial process 26. In one preferred embodiment, the time at which each data sample is acquired is coded to the acquired data itself such that acquisition time information is also provided for each data sample of the data block during I/O module readout. Alternately, the I/O module executes a stored program that provides a time-stamp identifier 59 for the contents of the buffer portion 58a-58d based on when the contents were acquired. For instance, in one embodiment, the time-stamp identifier 59 for a given data block 58a corresponds to the time the last sample of the data block 58a was acquired. The industrial controller may then execute a stored program within in the industrial controller to extrapolate the timing for all data samples within the data block based on the time-stamp identifier and information regarding the Real Time Sample (RTS) period of the I/O module, and size of the data block.

Data is readout from the I/O module 20 and provided to the industrial controller across a communications backplane 18. The backplane 18 has sufficient bandwidth such that the buffer partitions 58a-58d can be readout in parallel during data production or polling of the I/O module 20. Alternately, the buffer partitions 58a-58d may be readout in series.

Figure 6:
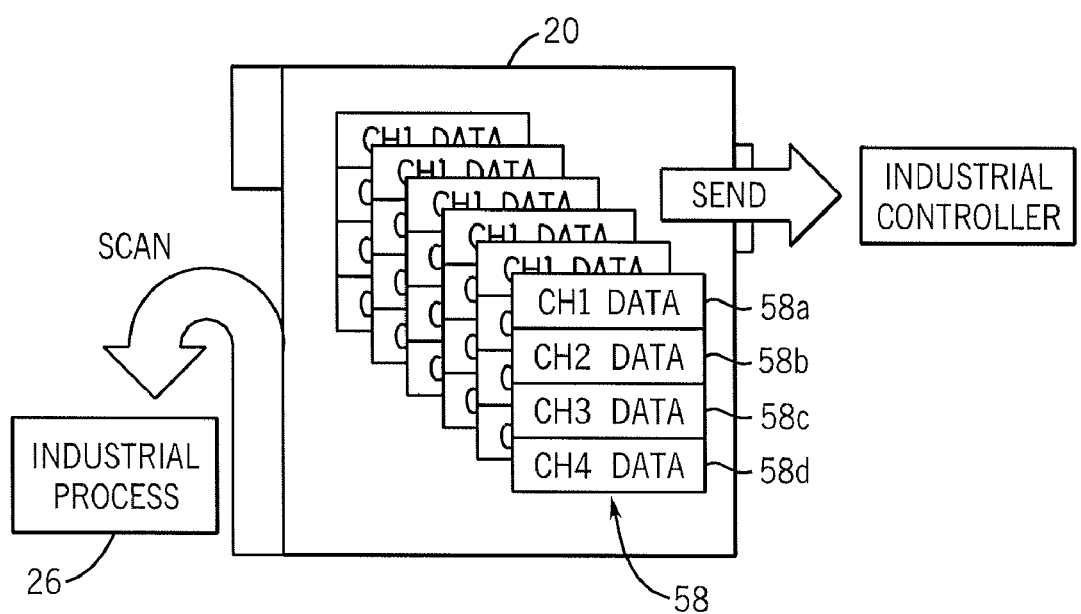
FIG. 6 is a block diagram illustrating data flow by a multi-channel I/O module with an industrial controller.

FIG. 6 illustrates cyclical operation of an I/O module 20 according to one aspect of the present disclosure. In the illustrated example, the I/O module 20 acquires four channels of data from an industrial process 26 during the interval between each data production or I/O module readout. At each I/O module readout or data production, data acquired over multiple samples intervals is output to the industrial controller in a number of data block, whereupon the buffer partitions 58a-58d are cleared. Thereafter, data acquisition begins again with data sampling and data storage until the next transfer of data to the industrial controller. As described above, in a preferred embodiment, the size of the buffer partitions 58a-58d is such that data for all samples acquired between I/O module readouts can be stored.

The present invention has been described in terms of the preferred embodiment, and it is recognized that equivalents, alternatives, and modifications, aside from those expressly stated, are possible and within the scope of the appending claims.

I claim:

1. A data industrial control I/O system comprising:
    an I/O module having one or more data channels, each of the data channels receiving a time varying signal corresponding to a portion of an industrial process at a first sampling rate,
    a connector providing a connection to a backplane adapted to communicate with an industrial controller;
    a clock synchronizable with a clock of the industrial controller to provide identical absolute time values at the I/O module and the industrial controller;
    a processor executing a stored program to assemble a set of sequentially acquired samples for each signal into a data block, each sample representing a different time value of the signal, and assigns an absolute time-stamp identifier to the data block using the clock, wherein the set includes at least two sequentially acquired samples from the signal and wherein each I/O module stores multiple sample sets from each of the data channels into multiple data blocks that are output by the I/O module to the industrial controller to provide a snap-shot of the industrial process during a time period in which the multiple sample sets were sampled and to transmit the data block to the industrial controller at a second sampling rate slower than the first sampling rate for control of the industrial process;
    wherein the absolute time-stamp identifier assigned to each of the multiple data blocks is coded to the acquired data, and an absolute time-stamp for each data sample of each data block of the multiple data blocks is provided to the industrial controller during I/O module readout.

2. The I/O system of claim 1 wherein these sequentially acquired samples are acquired at a regular interval and wherein the set of sequentially acquired samples includes a specific acquired signal sample and wherein the I/O module determines a time when the specific acquired signal sample was acquired and uses that time as the time-stamp identifier for the entire data block.

3. The I/O system of claim 1 wherein the data block includes all sequentially acquired samples by the I/O module during a period defined by the second sampling rate or an I/O module production rate.

4. The I/O system of claim 1 wherein the second sampling rate is one of either the polling rate in a polled system or a ladder scan rate in a producer/consumer model.

5. The I/O system of claim 4 wherein the first sampling rate is at least 2 times faster than the second sampling rate.

6. The I/O system of claim 1 wherein each data channel acquires a unique set of sequentially acquired signals from a dedicated portion of the industrial process.

7. A method of operation for an I/O module for an industrial process having an industrial controller that reads data from the I/O module, processes the data, and controls the industrial process with the processed data, wherein the I/O module includes one or more data channels that each sample a respective portion of the industrial process and wherein the method is configured to control communication of the I/O module with a component of the industrial process and the industrial controller by causing the I/O module to:
    synchronize an internal clock of the I/O module with a clock of the industrial controller to provide identical absolute time values at the I/O module and the industrial controller;
    sample a time varying signal from the data channel of at least one component of the industrial process at a first sampling rate to acquire a set of sequential data samples, each sample representing a different time value of the signal;
    store the set of data samples in a data block in a time-ordered fashion;
    store multiple sample sets from each of the data channels into multiple data blocks;
    assign an absolute time-stamp identifier from the clock of the I/O module to each of the multiple data blocks; and
    transmit the multiple data blocks to the industrial controller at a second sampling rate slower than the first sampling rate to provide a snap-shot of the industrial process during a time period in which the multiple sample sets were sampled;

wherein the absolute time-stamp identifier assigned to each of the multiple data blocks is coded to the acquired data, and an absolute time-stamp for each data sample of each data block of the multiple data blocks is provided to the industrial controller during I/O module readout.

8. The method of claim 7 wherein the I/O module is caused to assign a time-stamp by determining a time when a specific sample of the set of samples was sampled and assigning that time to the data block.

9. The method of claim 7 wherein the second sampling rate is defined by polling of the I/O module by the industrial controller at a regular interval or by an internally defined production rate.

10. The method of claim 7 wherein the I/O module is further caused to output the multiple data blocks in parallel.

* * * * *